(12) United States Patent
Scott

(10) Patent No.: US 6,651,970 B2
(45) Date of Patent: Nov. 25, 2003

(54) MULTI-FUNCTIONAL CUTTING BOARD

(76) Inventor: Robert Scott, 1905 S. Kirkman Rd., Apt. 525, Orlando, FL (US) 32811

( * ) Notice: Subject to any disclaimer, the term of this patent is extended or adjusted under 35 U.S.C. 154(b) by 67 days.

(21) Appl. No.: 09/992,654

(22) Filed: Nov. 19, 2001

(65) Prior Publication Data

US 2003/0094744 A1 May 22, 2003

(51) Int. Cl.$^7$ ................................................ B23Q 3/00
(52) U.S. Cl. ...................... 269/289 R; 269/13; 269/15; 269/302.1
(58) Field of Search ............................. 269/289 R, 13, 269/302.1, 15; 7/110, 170

(56) References Cited

U.S. PATENT DOCUMENTS

| | | | |
|---|---|---|---|
| 2,609,024 A | * | 9/1952 | Russ .......................... 146/215 |
| 4,041,964 A | * | 8/1977 | Shamoon ................ 134/115 R |
| 4,243,184 A | * | 1/1981 | Wright ...................... 241/273.2 |
| 4,653,737 A | * | 3/1987 | Haskins ......................... 269/13 |
| 5,100,115 A | | 3/1992 | Schorn |
| 5,366,208 A | | 11/1994 | Benjamin |
| 5,382,009 A | | 1/1995 | Mertz et al. |
| 5,386,978 A | | 2/1995 | Ladwig |
| 5,527,022 A | | 6/1996 | Gibson |
| 5,546,852 A | | 8/1996 | Bidwell |
| 5,626,067 A | * | 5/1997 | Lothe ............................ 83/761 |
| 5,791,479 A | | 8/1998 | Beres |
| 5,865,105 A | * | 2/1999 | Pepelanov .................... 99/446 |
| 5,904,271 A | | 5/1999 | Collins et al. |
| 5,938,185 A | | 8/1999 | Kletter |
| 5,984,294 A | | 11/1999 | Bogomolny |
| 6,026,972 A | | 2/2000 | Makowski |

* cited by examiner

Primary Examiner—Joseph J. Hail, III
Assistant Examiner—Daniel Shanley
(74) Attorney, Agent, or Firm—Michael I. Kroll

(57) ABSTRACT

The present invention 10 discloses a cutting board having multiple cutting surfaces 20, 48, and 66 for use in different applications. A porous cutting surface 20 is used when working with any food product that tends to purge fluids 46. This top allows the natural juices from the food product 14 to pass through the cutting board 20 via holes 22 and into a holding container 30, rather than running off the sides. A trap door cutting surface 48 is for general use with a wide variety of purposes. The trap door 50 allows the user to quickly remove products from the cutting surface via hole 56 and send directly into the holding container 30. A cold cutting surface 66 comprises a cutting surface 66 with a thin metal conductor plate 68 within it, that when placed over a provided ice gel pack 70 contains a cool temperature while being worked on.

15 Claims, 9 Drawing Sheets

MULTI-FUNCTIONAL CUTTING BOARD

BACKGROUND OF THE INVENTION

1. Field of the Invention

The present invention relates generally to cutting surfaces and, more specifically, multifunctional cutting surface. The cutting surface device of the present invention is designed to replace the traditional kitchen cutting board with a more practical cutting surface, performing a variety of functions and increasing the efficiency of the end user. The present invention consists of multiple pieces that make the entire unit as a whole.

The foundation of the entire unit as a whole is the base. The base unit is a shell, designed to stabilize the cutting surfaces and act as a universal receiver of all other pieces. The base unit is made up of a three-sided shell. The inner section of this shell is grooved with a track for means of inserting the variety of holding containers that support a specific surface. The base is designed to act as the primary receiver of multiple and interchangeable cutting surfaces. Each surface is fitted with notched grooves, one in each of the four corners of each surface. These grooves act as the female receiver for metal rods extending from the base unit that match up symmetrically with each groove found on the belly of the cutting top. These secure the unit as a whole, preventing any shifting or lateral movements of the surface while attached to the base.

The first of a variety of surfaces that are interchangeable with the main base unit are as follows. The first is "the porous" cutting top, consisting of a surface made of tiny holes that allow food juices to pass the board into a receiving receptacle. This cutting surface is used when working with any food products that tend to purge fluids. The top allows the juices from the food product to pass through the cutting board instead of running off the side. This particular surface also relies on a hard, plastic tube plate that directs the purged fluids into a holding receptacle. The plate fits snugly into the bottom portion of the cutting surface and top portion of the holding container. For each hole in the cutting surface and holding container there is a matching tube on the plate. Each hole at the top of the holding container is fitted with a one-way, resealable rubber piece, that allows the tube to penetrate the container's surface and deposit liquid, but not dispense its contents. The holding receptacle is fitted with a removable cap that allows the user to pour out any liquid accumulated in the unit.

The next cutting surface is referred to as the "trap door" cutting surface. The function of this work surface is for general purposes (i.e., chopping, dicing, slicing, etc.). The function of the trap door is to allow the user to quickly remove products (waste or useable trimmings) from the cutting surface. This enables the end user to save steps when transferring products from the cutting surface into a separate unit. This also eliminates the user from having to lift the entire cutting unit, like a platter, and scrape the contents into a separate receptacle. This cutting surface has a flip-top shell that allows the user to slide product or waste neatly into a holding container underneath the cutting surface. The holding container is secured within the base unit of the cutting board itself and is designed to slide into and out of the base unit to empty and fill as necessary.

The third cutting surface is the "butcher block" cutting top. The unique function of this surface is that it is designed to keep the surface of the cutting top cold while working with perishable foods. The cutting surface contains a thin, metal plate that is exposed on the belly of the cutting surface. This metal plate is then encased with material suitable for cutting purposes. Under the belly of the cutting surface, attached to the base is a refreezable ice pack that contacts the thin metal plate at the belly of the cutting top, acting as a conductor allowing the surface to remain cold. The cold pack like the other containers slides into the universal shell with the base unit and can be slipped in and out as necessary.

2. Description of the Prior Art

There are other cutting surface devices designed to improve the cutting of products. Typical of these in U.S. Pat. No. 5,100,115 issued to Schom on Mar. 31, 1992.

Another patent was issued to Benjamin on Nov. 22, 1994 as U.S. Pat. No. 5,366,208. Yet another U.S. Pat. No. 5,382,009 was issued to Mertz on Jan. 17, 1995 and still yet another was issued on Feb. 7, 1995 to Ladwig et al. as U.S. Pat. No. 5,386,978.

Another patent was issued to Gibson et al on Jun. 18, 1996 as U.S. Pat. No. 5,527,022. Another patent was issued to Bidwell et al on Aug. 20, 1996 as U.S. Pat. No. 5,546,852. Another patent was issued to Beres et al on Aug. 11, 1998 as U.S. Pat. No. 5,791,479. Another patent was issued to Collins et al on May 18, 1999 as U.S. Pat. No. 5,904,271. Another patent was issued to Kletter et al on Aug. 19, 1999 as U.S. Pat. No. 5,938,185. Another patent was issued to Bogomolny et al on Nov. 16, 1999 as U.S. Pat. No. 5,984,294. Another patent was issued to Makowski et al on Feb. 22, 2000 as U.S. Pat. No. 6,026,972.

U.S. Pat. No. 5,100,115

Inventor: James B. Schom

Mar. 31, 1992

A cutting board with a planar cutting surface and one or more generally vertical retaining members extending upward from and perpendicular to the cutting surface, the retaining members thereby defining a vertical retention surface. The vertical retaining members may be in the form of solid wall shoulders at each end to accommodate a knife handle, a wall with a notch to permit cutting pendicular to the retention surface, or a plurality of pegs which may be arranged in various positions on the cutting board.

U.S. Pat. No. 5,366,208

Inventor: William Benjamin

Issued: Nov. 22, 1994

A cutting board system provides both a cutting board and a drip pan tray for receiving juices and trimmings which are cut from food particles. The cutting board mounts directly within a drip pan tray and is provided with at least one notch whereby juices may flow into the tray below. The tray is provided with a pour system to provide convenient cutting, serving and pouring of the food to be served.

U.S. Pat. No. 5,382,009

Inventor: Dyanna Mertz

Issued: Jan. 17, 1995

A portable hinged cutting board with drawer for recreational use, such as the popular picnic, is presented having a housing 10 with a folding extension 11 attached by a hinge means 12 to the top edge along the length of the housing 10.

The folding extension 11 corresponds in length and width with top of the housing thereby when folded in a closed position it is adjacent to the upper surface of the housing top 10a. The housing 10 can generally be described as having a rectangular top 10a two short sides 10b one long side 10c thereby forming a compartment 10e. A drawer 13 fits snugly into the compartment 10e and is of such a width that when positioned inside as in the closed position the outer wall 13a of the drawer 13 is flush with the edges of the housing 10. The drawer is held in the closed position inside the housing by a fastening means 18 thereby preventing the drawer from opening during transport. The drawer 13 is extended as far as possible until it is restricted by a stopping means 19 from removal from the housing 10. The folding extension 11 is rotated along the axis of the hinge 12 resting in a position on top of the drawer 13 thereby doubling the area available for food preparation by combining the upper surface of the housing top 10a and the adjacent surface 11a of the folding extension 11 which are aligned on the same plane forming a cutting "board" area.

U.S. Pat. No. 5,386,978

Inventor: Todd Ladwig

Issued: Feb. 7, 1995

A cutting board which is substantially rectangular in shape and made of a polymer material such as polyethylene. The cutting board includes a handle at one end, and an inner groove surrounding three of the edges and the handle on an upper portion of the cutting board. A living hinge extends across a lower portion of the cutting board to provide for movement of the lower portion of the cutting board. The movement or the lower portion of the cutting board is particularly useful for sweeping cut objects, such as vegetables, meats or other objects into a bowl or a pan. An alternative embodiment discloses a locking tab for fixing the upper and lower rectangular portion with respect to each other.

U.S. Pat. No. 5,546,852

Inventor: Robert Bidwell

Issued: Aug. 20, 1996

A food preparation assembly is disclosed which includes a carving board unit including a carving platform having a substantially planar carving surface with a collection channel defined therein extending about the periphery of the carving surface to collect drippings for separation into fat and juice, and a cutting board unit including an upper cutting surface and a lower undersurface. At least two parallel flanges depend from the undersurface of the cutting board unit which are dimensioned and configured to engage the collection channel in the carving platform to stabilize the cutting board unit during utilization.

U.S. Pat. No. 5,791,479

Inventor: William Beres

Issued: Aug. 11, 1998

A combination cutting board and storage container is disclosed. The combination cutting board and storage container can be used for food processing and storage purposes, for fishing bait and tackle processing and storage purposes, and for many other purposes. A storage container in the form of a bin has an opening at the top. The cutting board is formed so that it can fit over the opening. Attachment means are preferably provided for holding the cutting board to the bin. A handle is provided for carrying the combination cutting board and storage bin. The handle is preferably in the form of an arc which extends approximately from one end of the bin to the other. The handle, the side members, and the bin are preferably comprised of polyethylene foam or some other lightweight foam material.

U.S. Pat. No. 5,904,271

Inventor: Philip D. Collins

Issued: May 18, 1999

A chopping board system comprising a chopping board member having a substantially planar chopping surface, defined by a perimeter edge and a leg connecting surface; two latitudinal leg members extending from the leg connecting surface and sized such that when the chopping board member is supported on a planar surface by the leg members, the chopping board surface is oriented in parallel with the planar surface. A tab-in-slot connecting mechanism to temporarily hold purpose built collection hoppers at either end of the chopping board surface, one hopper being for the collection of chopped food and the other hopper being for the collection of cut scrap food. The two hoppers are similar in that their openings are dimensioned in a way as to make the upper edge of the hoppers no higher than the surface of the cutting board and so that their width be no greater than the width of the cutting surface. This close mating of the hoppers and the chopping board facilitates the easy and clean removal of the chopped food from the cutting surface to the hoppers. The two hoppers differ in that the chopped food hopper has relatively high angled walls that form a chute, which allows the chopped food to be poured easily from the chopped food hopper. The pouring chute also incorporates a series of horizontal graduate lines, which allow the hopper to be used as a measuring device.

U.S. Pat. No. 5,938,185

Inventor: Howard Kletter

Issued: Aug. 17, 1999

The present invention relates to a new and improved cutting board assembly comprising a base component having a substantially rectangular cutting surface with two opposing side walls depending therefrom. The area between the cutting surface and side walls define an interior chamber. The cutting surface has a plurality of apertures aligned in substantially parallel rows which are received within longitudinal channels having downwardly converging sidewalls for directing juices produced from cut food items into the apertures. A hollow cylindrical conduit is in fluid communication with the apertures and the interior chamber. Slidably received within the interior chamber of the base component is a drawer type collection tray which may be easily removed therefrom for receiving juices from the conduits. The base component also has a pair of substantially C-shaped support members each attached to an opposing side wall for elevating the cutting surface a predetermined distance from a table or kitchen counter. The C-shaped support members also provide a surface on which the drip tray rests when received within the interior chamber and on which the tray slides when inserted or removed therefrom.

U.S. Pat. No. 5,984,294

Inventor: Edward Bogomolny

Issued: Nov. 16, 1999

A cutting board assembly comprises a grid base member and a selectively removable surface layer. Both the base member and the surface layer are composed of a material suited for food service. The base has a flat level upper surface. The selectively removable skin layer is received over the base to provide a replaceable cutting surface thereto. The surface includes a downwardly extending skirt to provide a snug fit about the perimeter of the base. A curb extends upwardly from the cutting surface adjacent an outer edge thereof to provide a trap for inhibiting food or juices from sliding off the cutting surface. At least a portion of the cutting surface outer edge is free of the curb to enable the sliding transfer of food to and from the surface.

U.S. Pat. No. 6,026,972

Inventor: Gregory L. Makowski

Issued: Nov. 16, 1999

A debris receptacle for attachment to a cutting board comprising: a bag holding frame, a U-shaped backstop and attached legs, and a leg holding plate. The bag holding frame being rectangular and made of rigid material such as molded plastic or metal and capable of retaining a standard plastic bag of the sort used when purchasing fruits and vegetables at a food market. The U-shaped backstop being made of rigid material such as plastic or metal and having an internal ledge for supporting the bag holding frame and also having parallel extension legs extending horizontally from the ends of each side of the U-shaped backstop. The leg holding plate being fixedly attached to the underside of a standard cutting board. The leg holding plate having a pair of flanges located at each parallel edge for releasably retaining the parallel extension legs of the U-shaped backstop.

SUMMARY OF THE PRESENT INVENTION

The present invention discloses a cutting board having multiple cutting surfaces for use in different applications. A porous cutting surface is used when working with any food product that tends to purge fluids. This top allows the natural juices from the food product to pass through the cutting board via holes and into a holding container, rather than running off the sides. A trap door cutting surface is for general use with a wide variety of purposes. The trap door allows the user to quickly remove products from the cutting surface via a hole and send directly into the holding container. A cold cutting surface comprises a cutting surface with a thin metal conductor plate within it, that when placed over a provided ice gel pack maintains a cool temperature while being worked on.

A primary object of the present invention is to provide a cutting surface providing multiple functions increasing the efficiency of the user.

Another object of the present invention is to provide a cutting surface consisting of multiple pieces that make up the entire unit as a whole.

Yet another object of the present invention is to provide an interchangeable cutting surface consisting of three cutting surfaces, a tube plate, holding container a base unit and a cold pack surface.

Still yet another object of the present invention is to provide a cutting surface that interconnects all pieces. Yet another object of the present invention is to provide a cutting surface that fluids released from the product being cut may drain into a holding container via top cutting surface drain holes or trap door.

Yet another object of the present invention is to provide a cutting surface providing multiple functions increasing the efficiency of the user and consisting of multiple pieces that make up the entire unit as a whole. Also providing an interchangeable cutting surface consisting of three cutting surfaces, a tube plate, holding container and base unit.

Additional objects of the present invention will appear as the description proceeds.

The present invention overcomes the shortcomings of the prior art by providing a cutting surface providing an interchangeable cutting surface consisting of three cutting surfaces, a tube plate, holding container and base unit. And providing a cutting surface that fluids released from the product being cut may drain into a holding container via top cutting surface drain holes or trap door.

The foregoing and other objects and advantages will appear from the description to follow. In the description reference is made to the accompanying drawings, which form a part hereof, and in which is shown by way of illustration specific embodiments in which the invention may be practiced. These embodiments will be described in sufficient detail to enable those skilled in the art to practice the invention, and it is to be understood that other embodiments may be utilized and that structural changes may be made without departing from the scope of the invention. In the accompanying drawings, like reference characters designate the same or similar parts throughout the several views.

The following detailed description, is therefore, not to be taken in a limiting sense, and the scope of the present invention is best defined by the appended claim.

LIST OF REFERENCE NUMERALS

Figure 1:
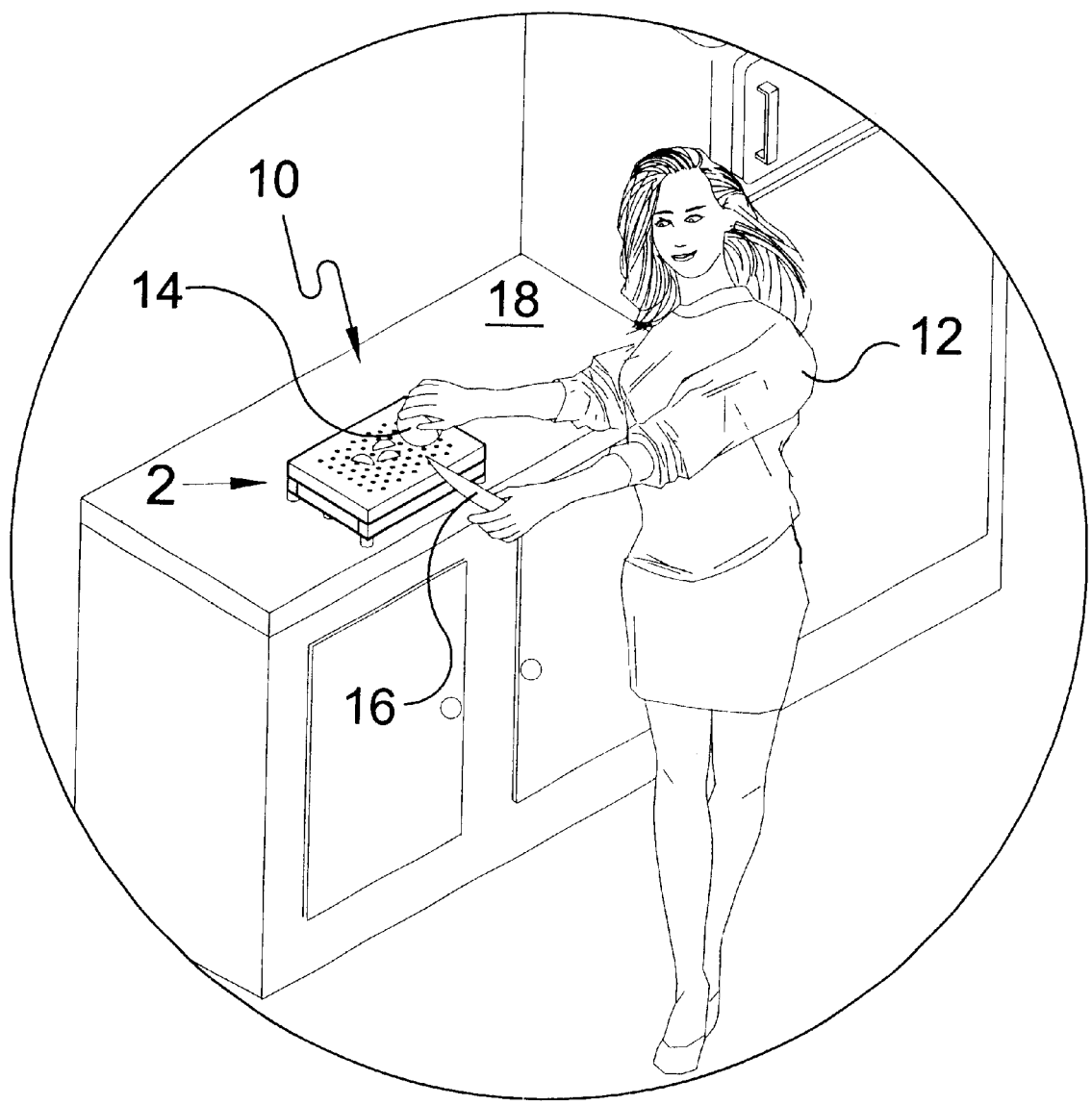
FIG. 1 is a perspective view of the present invention.

With regard to reference numerals used, the following numbering is used throughout the drawings.

10 present invention
12 user
14 foodstuff
16 knife
18 work surface
20 porous cutting surface
22 holes
24 base unit
25 hole
26 legs
28 tube plate
30 holding container
31 insert 32 resealable rubber insert piece
34 drain spout
35 drain spout cap
36 aperture
38 drain tube
40 corner rods
42 guide pegs
43 clips
44 track recess
45 locking notches
46 juice/fluid
48 trap door cutting surface
50 trap door
52 hinge
54 finger groove
56 hole
66 cold cutting surface
68 metal conducting plate
70 refreezable ice pack

DESCRIPTION OF THE PREFERRED EMBODIMENT(S)

In order that the invention may be more fully understood, it will now be described, by way of example, with reference to the accompanying drawings in which FIGS. 1 through 9 illustrate the present invention wherein a multi-functional cutting surface is disclosed.

Turning to FIG. 1, shown therein is a perspective view of the present invention 10 on a foundation or work surface 18. The design, a kitchen cutting board, consists of a more practical cutting surface, performing a variety of functions, increasing the efficiency of the user 12 who is holding foodstuff 14 and a cutting knife 16.

Figure 2:
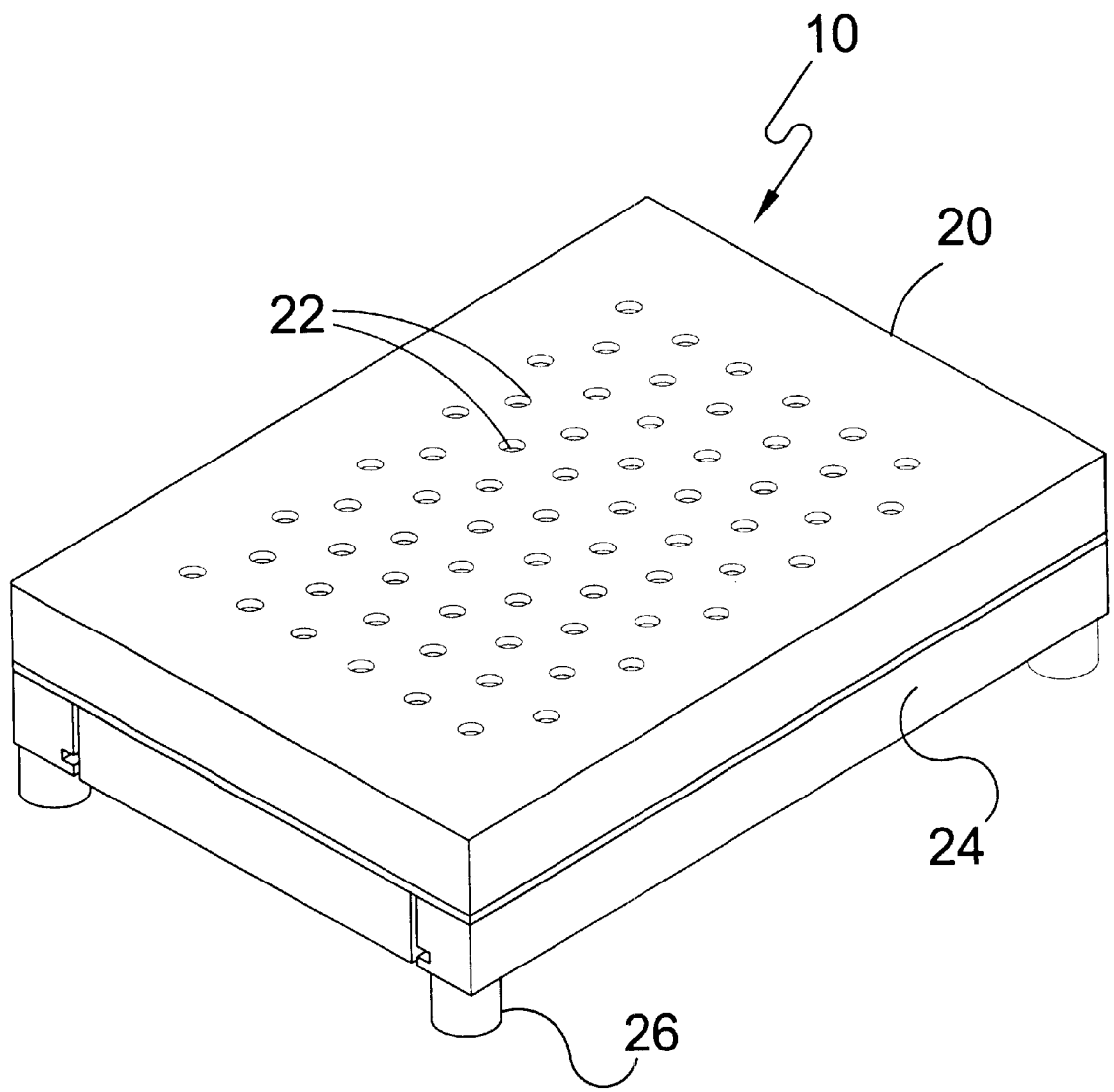
FIG. 2 is a perspective view of the present invention.

Turning to FIG. 2, shown therein is a perspective view of the present invention 10. The porous cutting surface 20 has multiple holes 22 therein and is used when working with any food product that tends to purge fluids. The top allows the natural juices from the food product to pass through the upper cutting board surface 20 via holes 22 and into a holding container, rather than running off the sides. Also shown is a base unit 24 with multiple legs 26.

Figure 3:
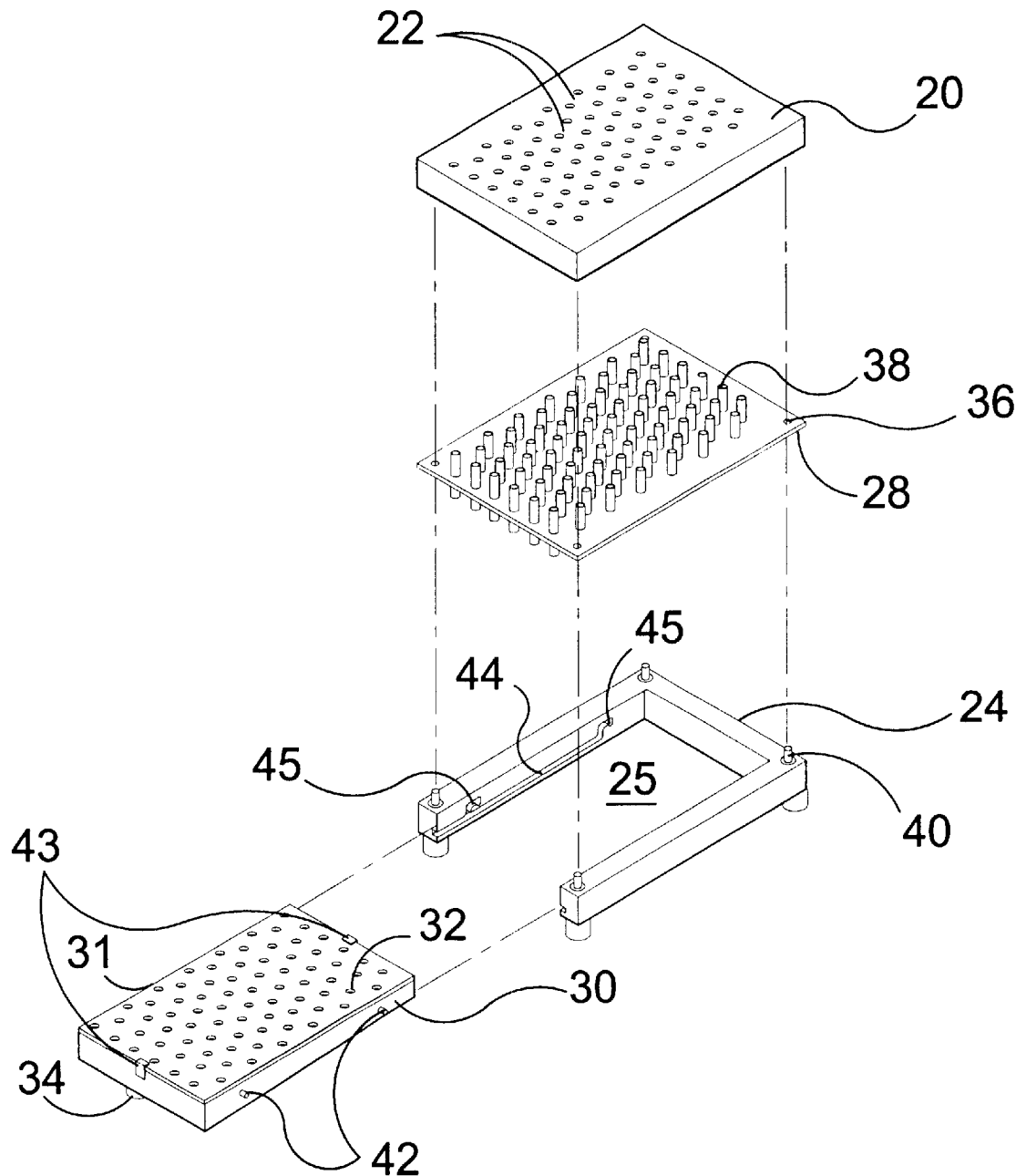
FIG. 3 is a exploded view of the present invention.

Turning to FIG. 3, shown therein is an exploded view of the present invention. The base unit 24 is a U-shaped, wooden or like shell frame open on one side having a large central hole 25 therein, designed to stabilize the cutting surfaces and act as a universal receiver of all other pieces. The design also consists of three, removable and/or interchangeable cutting surfaces. The first, a porous cutting top 20 consists of small porous holes 22 within the cutting surface that allows food to pass through. This cutting surface is used when working with any product that tends to purge fluids. This top allows the juices from the food product to pass through the cutting board instead of running off the side. When using the porous cutting surface, a hard plastic tube plate 28 is provided. The tube plate 28 directs the food juices from the upper surface into the holding container 30. The plate 28 fits snugly into the bottom portion of the cutting surface 20. For each hole in the cutting surface 20 there is a matching hollow drain tube 38 on the plate 28 itself. The top of the plate 28 attaches to the cutting surface 20 and its corner apertures 36 attach to the corner rods 40 upwardly disposed on each corner of base 24. The holding container 30 has tiny holes therein that match up with the bottom of the tube plate 28. Each hole at the top of the holding container is fitted with a one way resealable rubber piece 32, that allows the tubes to penetrate and deposit liquid but not dispense its contents. A pair of release clips 43 are provided for connecting plate 31 to the top of container 30. The holding container is fitted with an outlet or drain spout 34 having a cap 35 thereon on its underside to drain the contents. The holding container 30 has a pair of guide pegs 42 disposed on its side edges which slide into the open end of base 24 and mate into a pair of track recesses 44 disposed on the inner faces of the base unit 24. The track recesses have a pair of locking notches 45 disposed therein to lock the holding container 30 thereto.

Figure 4:
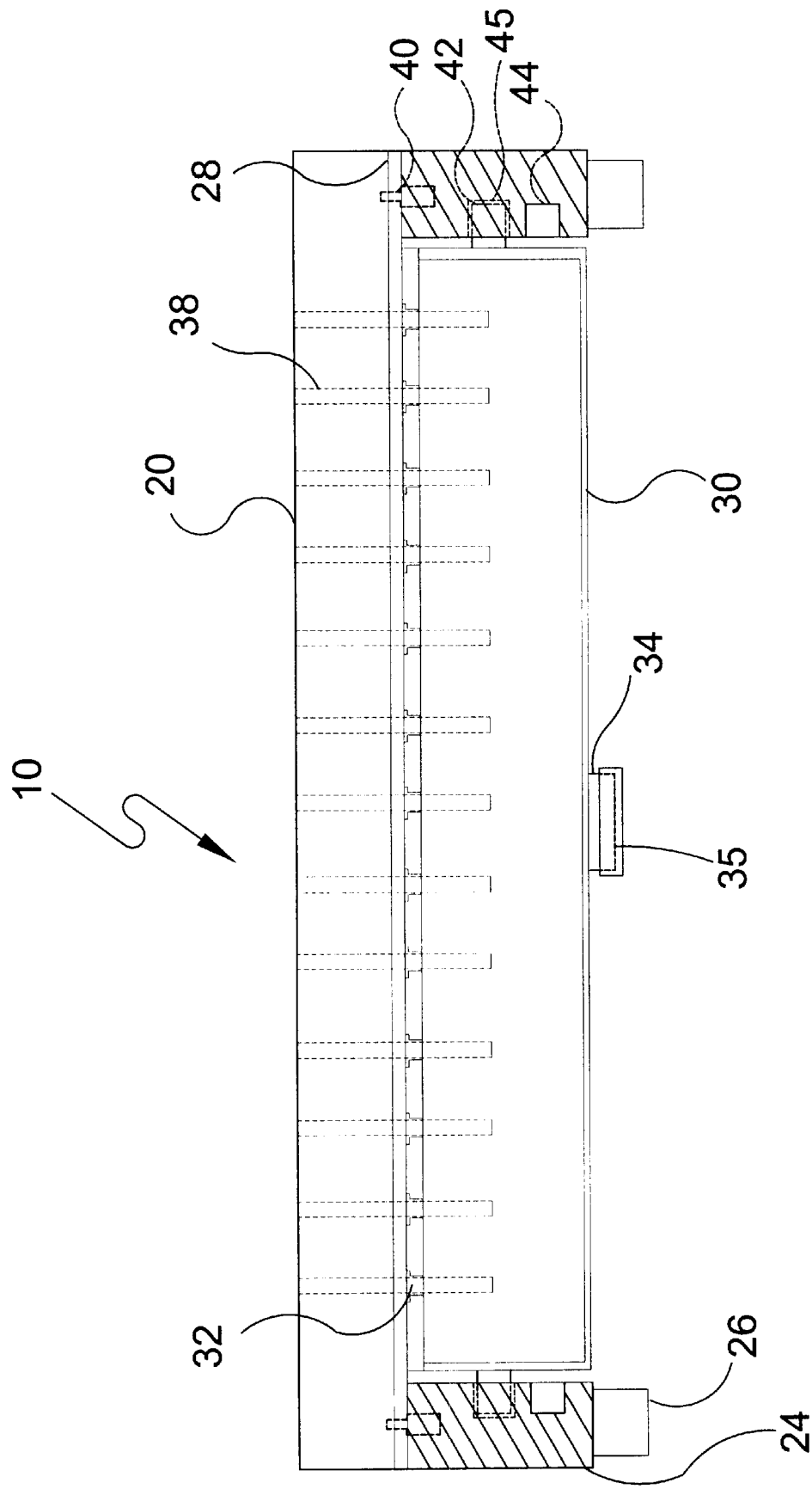
FIG. 4 is a sectional view of the present invention.

Turning to FIG. 4, shown therein is a sectional view of the present invention 10. The tube plate 28 fits snugly into the bottom portion of the cutting surface 20, and for each hole in the cutting surface, there is a matching tube 38 on the plate. The top of the plate attaches to the cutting surface and the bottom attaches to the holding container 30. The drain cap 35 is attached to drain spout 34. Other elements previously disclosed are also shown.

Figure 5:
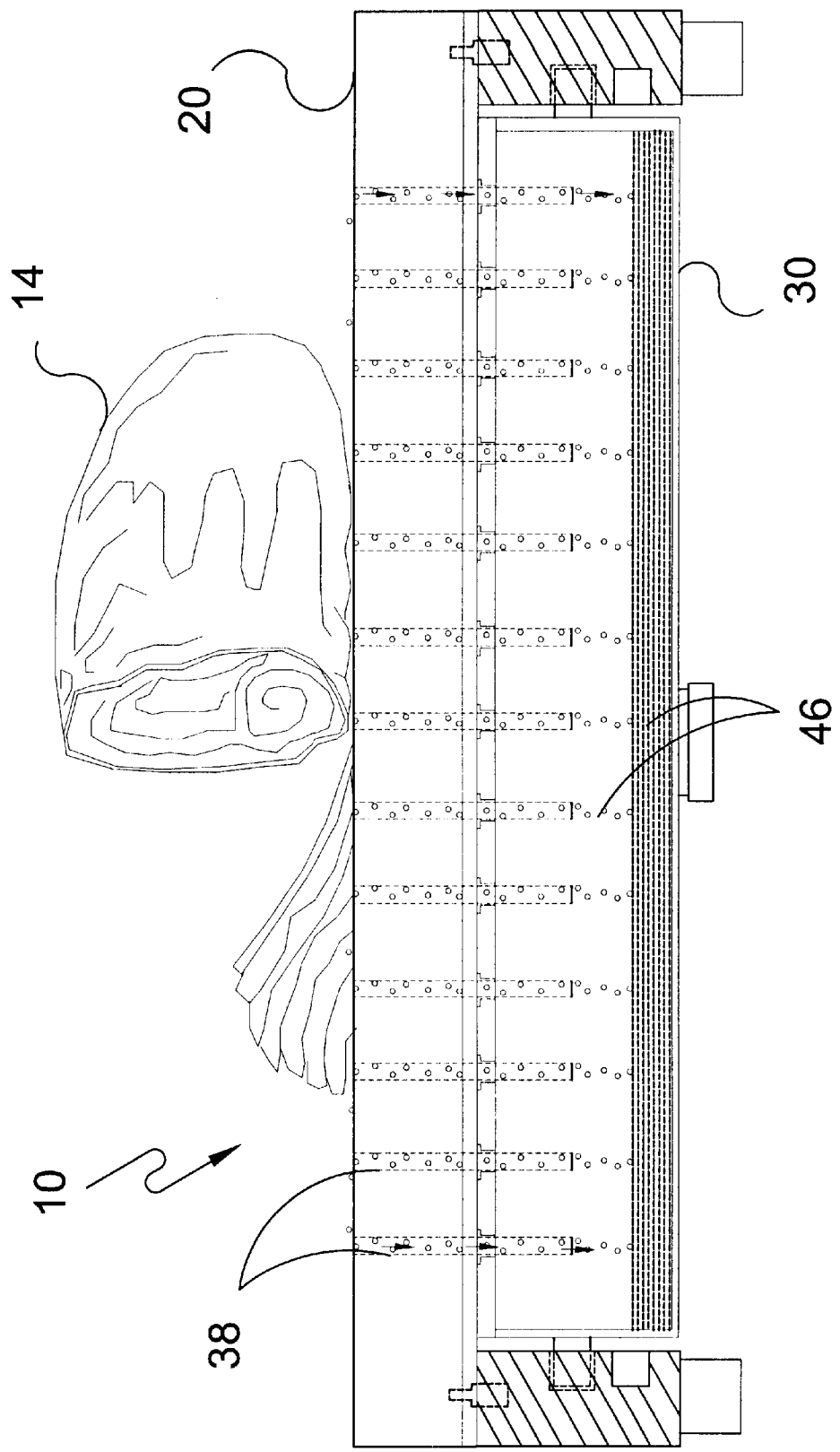
FIG. 5 is a sectional view of the present invention.

Turning to FIG. 5, shown therein is a sectional view of the present invention 10. The holding container 30 is fitted under the cutting surface 20 and acts as a catching unit for juices 46 that pass through the drain tubes 38 from the cutting surface from foodstuff 14.

Figure 6:
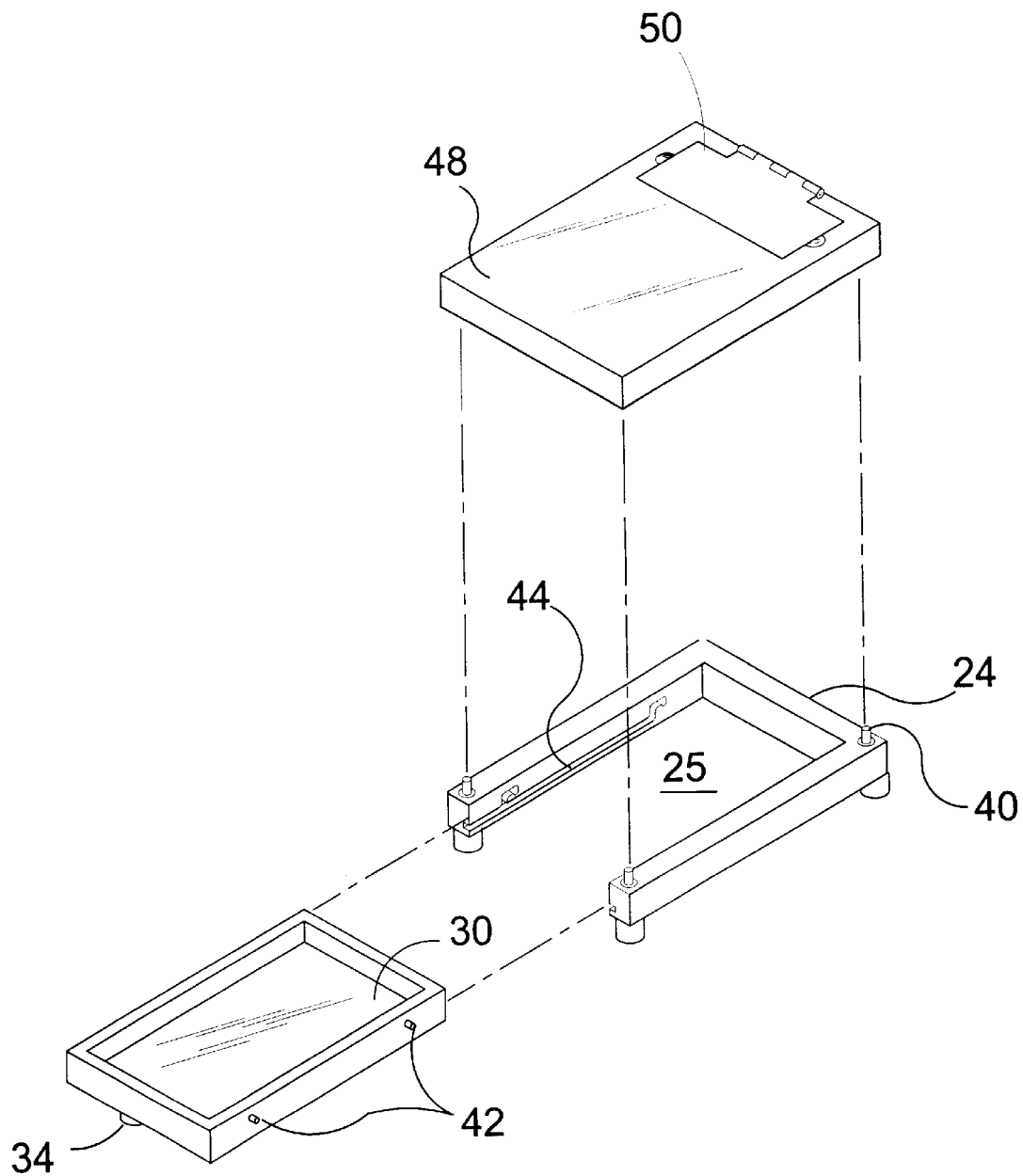
FIG. 6 is an exploded view of the present invention alternate cutting surface.

Turning to FIG. 6, shown therein is an exploded view of the present invention 10 alternate cutting surface. The trap door cutting surface 48 is for general use with a wide variety of purposes. The hinged trap door 50 allows the user to quickly remove products from the cutting surface and send them directly into the holding container 30. When using the trap door cutting surface 48, the plastic tube plate is not used. Only the holding container 30 and the base unit 24 are used. The multiple piece cutting unit makes for a more practical cutting surface performing a variety of functions and tasks increasing the efficiency of the user. The trap door cutting surface, is used for general purposes and a wide variety of food products. Other elements previously disclosed are also shown.

Figure 7:
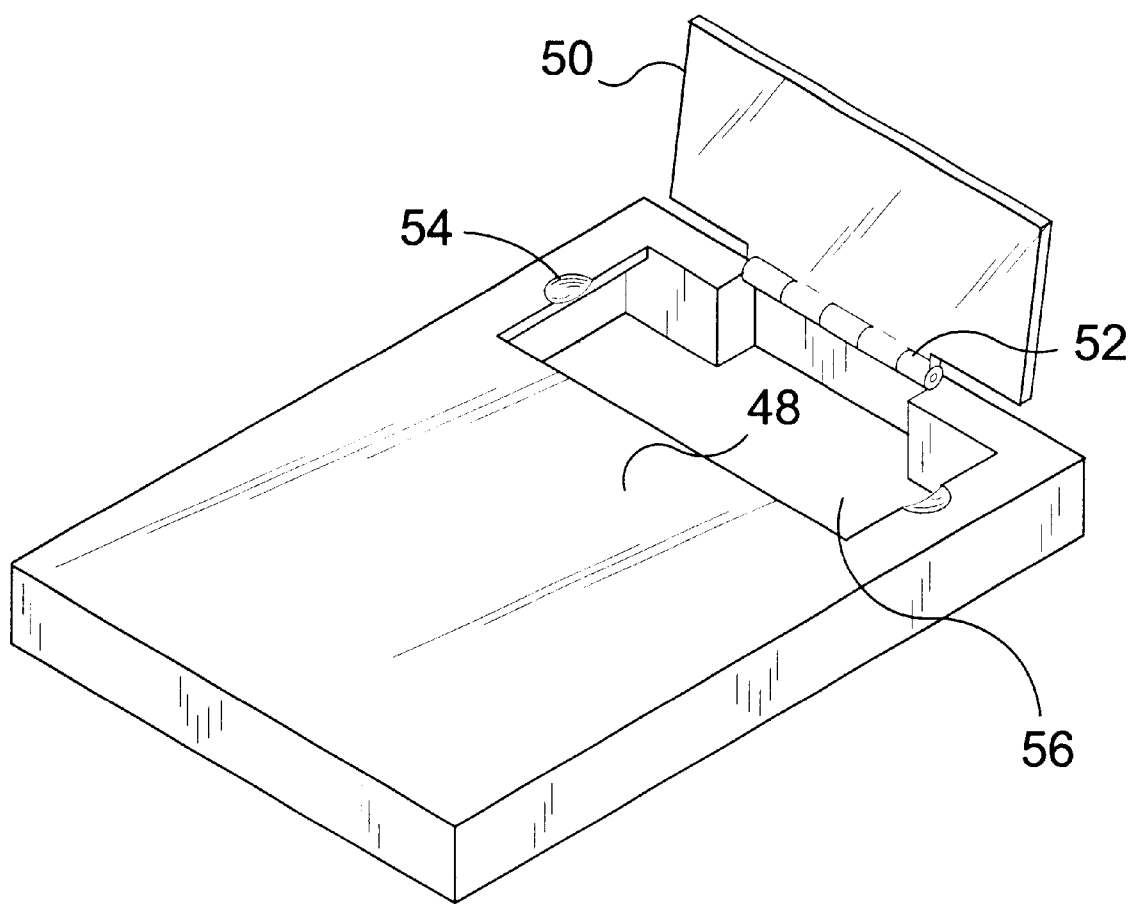
FIG. 7 is a perspective view of the trap door cutting surface of the present invention.

Turning to FIG. 7, shown therein is a perspective view of the trap door cutting surface 48 of the present invention. The purpose of the trap door 50 with hinge 52 is to allow the user to quickly remove products from the cutting surface without having to transfer products from container to container. This cutting surface contains a pair of finger grooves 54 which are disposed on each side of trap door 50 so that a user can easily lift the door and transfer products through hole 56.

Figure 8:
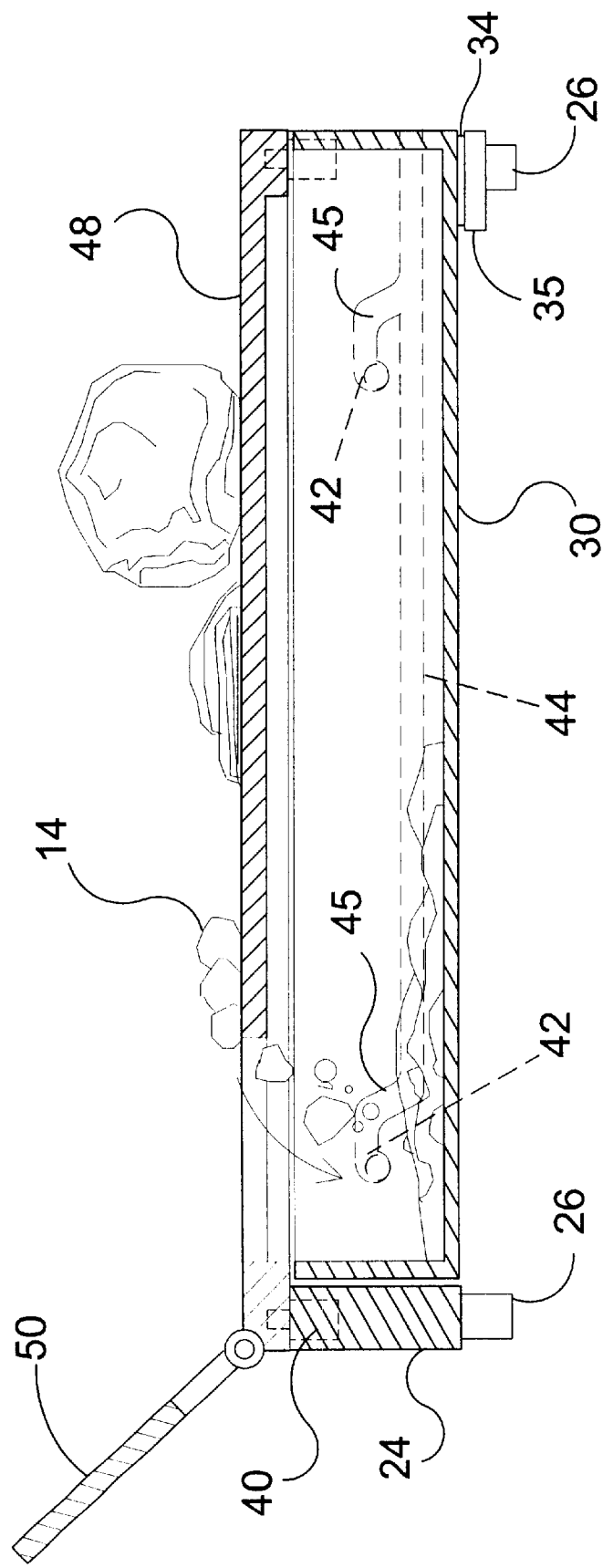
FIG. 8 is a sectional view of the trap door cutting surface of the present invention.

Turning to FIG. 8, shown therein is a sectional view of the trap door cutting surface 48 with trap door 50 of the present invention. Other elements previously disclosed are also shown.

Figure 9:
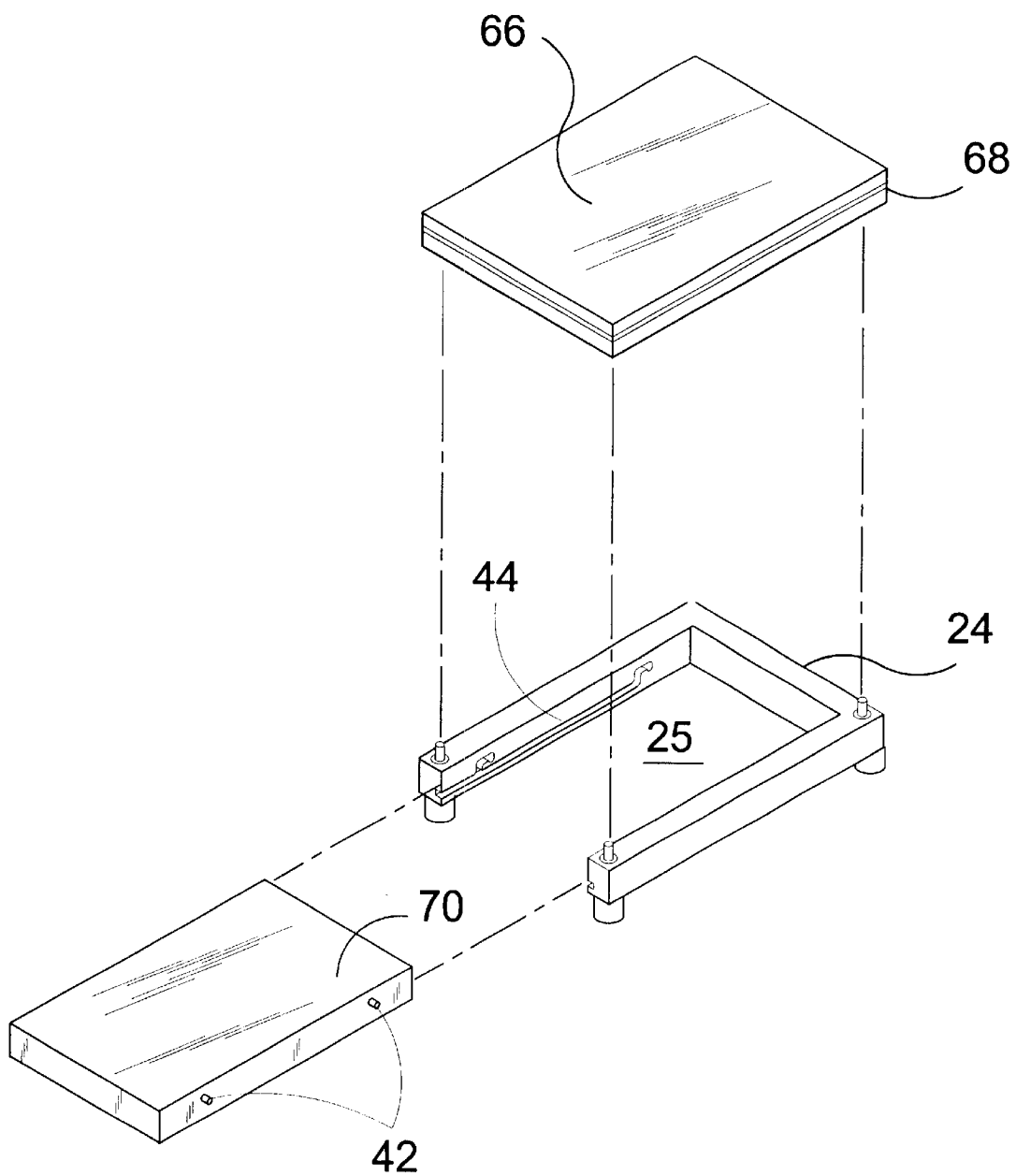
FIG. 9 is an exploded view of the present invention, cold surface cutting board.

Turning to FIG. 9, shown therein is an exploded view of the present invention as an alternate cold cutting surface 66. The device consists of a cutting surface 66 with a thin metal conductor plate 68 disposed near its bottom side and sandwiched within it, that when placed over the provided refreezable ice gel pack 70 will maintain a cool temperature while being worked on. Cutting surface 66 contains a thin metal conductor plate 68 that in conjunction with the provided refreezable ice gel pack 70 will maintain a cold surface on the top of the cutting surface so as to keep food that is being prepared chilled. This unit consists of a cutting surface 66, a refreezable pack 70 and a base unit 24. The refreezable pack may be frozen prior to use. When frozen, the pack 70 with pegs 42 slides into the tracks 44 of the base unit 24 as previously disclosed. The cutting surface 66 is then placed on top. The freezer pack 70 chills the thin conductive plate and likewise cools the cutting surface. Other elements previously disclosed are also shown.

What is claimed to be new and desired to be protected by Letters Patent is set forth in the appended claims:

1. An apparatus for a cutting board for cutting foodstuffs, comprising:
    a) a first, upper member, said upper member being generally planar, said upper member generally rectangular shaped, said upper member having a top surface and a bottom surface;
    b) said upper member having a plurality of holes therein through which fluids can pass;
    c) a second, U-shaped base member, said base member being a frame having a large central opening therein, said base member having a top side and a bottom side;
    d) a first means for connecting said first, upper member to said second, base member whereby said upper member is removably connected to said base member;
    e) a third, container member disposed within said large central opening of said base member for receiving fluids from said upper member, said container having walls with a top edge, said container having a bottom surface;
    f) an insert member disposed on said top edge of said walls of said container, said insert member having a plurality of holes therein, said insert member being generally planar, said insert member having a second means for connection to said container whereby said insert member is removably connected to said container member;
    g) a third means for connecting said third container member to said base member, whereby said container member is removably connected to said base member; and,
    h) a fourth, tube plate member disposed between said first, upper member and said insert member, said tube plate member being generally planar, said tube plate member having a plurality of generally upright standing tubes passing therethrough, said tubes connecting said holes of said upper member to said holes of said insert member so that fluids pass from said upper member to said container member.

2. The apparatus of claim 1, wherein said first means for connecting said first, upper member to said second, base member further comprises a corner rod upwardly disposed on each corner of said top side of said base member, wherein said bottom of said upper member has a hole therein on each corner thereof, said rods of said top side of said base member for insertion into said holes of said bottom side of said upper member.

3. The apparatus of claim 2, wherein said second means for connection of said insert member to said container further comprises a plurality of clips disposed on the edges of said insert member and said container.

4. The apparatus of claim 3, wherein said third means for connecting said container member to said base member further comprises a pair of pegs disposed on the edges of said container member, further said base member having a pair of track recesses disposed on the inner edges of said base member, said track recesses for slidingly receiving said pegs.

5. The apparatus of claim 4, said track recesses having at least one locking notch therein for securing said pegs therein.

6. The apparatus of claim 5, further comprising a drain spout disposed on said container member.

7. An apparatus for a cutting board for cutting foodstuffs, comprising:
    a) a first, upper member, said upper member being generally planar, said upper member generally rectangular shaped, said upper member having a top surface and a bottom surface;
    b) said upper member having a hole therein through which foodstuffs can pass;
    c) a second, U-shaped base member, said base member being a frame having a large central opening therein, said base member having a top side and a bottom side;
    d) a first means for connecting said first, upper member to said second, base member whereby said upper member is removably connected to said base member;
    e) a third, container member disposed within said large central opening of said base member for receiving foodstuffs from said upper member, said container having walls with a top edge, said container having a bottom surface;
    f) a second means for connecting said third container member to said base member, whereby said container member is removably connected to said base member;
    g) means for a trap door disposed over said hole of said upper member whereby said hole can be opened and closed; and
    h) said first means for connecting said first, upper member to said second, base member further comprises a corner rod upwardly disposed on each corner of said top side of said base member, wherein said bottom of said upper member has a hole therein on each corner thereof, said rods of said top side of said base member for insertion into said holes of said bottom side of said upper member.

8. The apparatus of claim 7, wherein said second means for connecting said container member to said base member further comprises a pair of pegs disposed on the edges of said container member, further said base member having a pair of track recesses disposed on the inner edges of said base member, said track recesses for slidingly receiving said pegs.

9. The apparatus of claim 8, said track recesses having at least one locking notch therein for securing said pegs therein.

10. The apparatus of claim 9, further comprising a drain spout disposed on said container member.

11. The apparatus of claim 10, wherein said means for a trap door further comprises a trap door having a hinge on one edge thereof, a pair of finger grooves disposed in the top of said upper member, wherein said trap door hingedly mates with said hole of said upper member.

12. An apparatus for a cutting board for cutting foodstuffs, comprising:
    a) a first, upper member, said upper member being generally planar, said upper member being generally rectangular shaped, said upper member having a top surface and a bottom surface;
    b) a second, U-shaped base member, said base member being a frame having a large central opening therein, said base member having a top side and a bottom side;
    c) a first means for connecting said first, upper member to said second, base member whereby said upper member is removably connected to said base member;
    d) a third, refreezeable ice pack member disposed within said large central opening of said base member, said ice pack having walls with a top surface, said ice pack having a bottom surface;

e) a second means for connecting said third ice pack member to said base member, whereby said ice pack member is removably connected to said base member; and, f) a fourth, metallic plate member generally centrally disposed within said first, upper member, said plate member being generally co-planar with said first, upper plate member.

13. The apparatus of claim 12, wherein said first means for connecting said first, upper member to said second, base member further comprises a corner rod upwardly disposed on each corner of said top side of said base member, wherein said bottom of said upper member has a hole therein on each corner thereof, said rods of said top side of said base member for insertion into said holes of said bottom side of said upper member.

14. The apparatus of claim 13, wherein said second means for connecting said container member to said base member further comprises a pair of pegs disposed on the edges of said container member, further said base member having a pair of track recesses disposed on the inner edges of said base member, said track recesses for slidingly receiving said pegs.

15. The apparatus of claim 14, said track recesses having at least one locking notch therein for securing said pegs therein.

* * * * *